US010915479B1

(12) United States Patent
Levi et al.

(10) Patent No.: US 10,915,479 B1
(45) Date of Patent: Feb. 9, 2021

(54) HARDWARE ACCELERATION FOR UPLOADING/DOWNLOADING DATABASES

(71) Applicant: MELLANOX TECHNOLOGIES TLV LTD., Raanana (IL)

(72) Inventors: Lion Levi, Yavne (IL); Aviv Kfir, Nili (IL); Idan Matari, Lod (IL); Ran Shani, Hod Hasharon (IL); Zachy Haramaty, Hemed (IL); Nir Monovich, Hod Hasharon (IL); Matty Kadosh, Hadera (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/537,576

(22) Filed: Aug. 11, 2019

(51) Int. Cl.
*G06F 13/28* (2006.01)
*H04L 12/725* (2013.01)
*H04L 12/861* (2013.01)
*G06F 13/40* (2006.01)

(52) U.S. Cl.
CPC .......... *G06F 13/28* (2013.01); *G06F 13/4022* (2013.01); *H04L 45/306* (2013.01); *H04L 49/9063* (2013.01)

(58) Field of Classification Search
CPC .................. H04L 45/306; H04L 49/9063

USPC ......................................................... 710/308
See application file for complete search history.

(56) References Cited

U.S. PATENT DOCUMENTS 5,644,784 A 7/1997 Peek
2002/0152327 A1* 10/2002 Kagan ................. G06F 13/1605
709/250

\* cited by examiner

*Primary Examiner* — Henry Tsai
*Assistant Examiner* — Aurangzeb Hassan
(74) *Attorney, Agent, or Firm* — Kligler & Associates Patent Attorneys Ltd

(57) ABSTRACT

A network element includes one or more ports for communicating over a network, a processor and packet processing hardware. The packet processing hardware is configured to transfer packets to and from the ports, and further includes data-transfer circuitry for data transfer with the processor. The processor and the data-transfer circuitry are configured to transfer between one another (i) one or more communication packets for transferal between the ports and the processor and (ii) one or more databases for transferal between the packet processing hardware and the processor, by (i) translating, by the processor, the transferal of both the communication packets and the databases into work elements, and posting the work elements on one or more work queues in a memory of the processor, and (ii) using the data-transfer circuitry, executing the work elements so as to transfer both the communication packets and the databases.

12 Claims, 5 Drawing Sheets

HARDWARE ACCELERATION FOR UPLOADING/DOWNLOADING DATABASES

FIELD OF THE INVENTION

The present invention relates generally to communication networks, and particularly to efficient transfer of databases between hardware and software.

BACKGROUND OF THE INVENTION

In communication network elements, data may be transferred from a processor to memory that is embedded in a packet-handling hardware, or in the opposite direction from the memory embedded in the packet-handling hardware to the processor. Techniques to transfer data between a CPU and memory, using linear direct-memory access (DMA) are described, for example, in U.S. Pat. No. 5,644,784.

SUMMARY OF THE INVENTION

An embodiment of the present invention that is described herein provides a network element including one or more ports for communicating over a network, a processor and packet processing hardware. The packet processing hardware is configured to transfer packets to and from the ports, and further includes data-transfer circuitry for data transfer with the processor. The processor and the data-transfer circuitry are configured to transfer between one another (i) one or more communication packets for transferal between the ports and the processor and (ii) one or more databases for transferal between the packet processing hardware and the processor, by (i) translating, by the processor, the transferal of both the communication packets and the databases into work elements, and posting the work elements on one or more work queues in a memory of the processor, and (ii) using the data-transfer circuitry, executing the work elements so as to transfer both the communication packets and the databases.

In some embodiments, the databases include one or more of (i) a configuration database that the processor sends to the packet processing hardware for configuring the packet processing hardware, and (ii) a hardware status database that the packet processing hardware sends to the processor. In an embodiment, the packet processing hardware includes a shared queue for buffering data associated with both the communication packets and the databases.

In an example embodiment, the network element includes a network switch, and the packet processing hardware is configured to route the packets between the ports. In another embodiment, the network element includes a network interface, and the packet processing hardware is configured to forward the packets between the ports and a host system.

There is additionally provided, in accordance with an embodiment of the present invention, a communication method in a network element including one or more ports connected to a network, a processor and packet processing hardware. The method includes transferring packets to and from the ports using the packet processing hardware, and transferring, between the processor and data-transfer circuitry in the packet processing hardware, (i) one or more communication packets for transferal between the ports and the processor and (ii) one or more databases for transferal between the packet processing hardware and the processor, by (i) translating, by the processor, the transferal of both the communication packets and the databases into work elements, and (ii) posting the work elements on one or more work queues in a memory of the processor. The work elements are executed using the data-transfer circuitry so as to transfer both the communication packets and the databases.

The present invention will be more fully understood from the following detailed description of the embodiments thereof, taken together with the drawings in which:

DETAILED DESCRIPTION OF EMBODIMENTS

Overview

Figure 1:
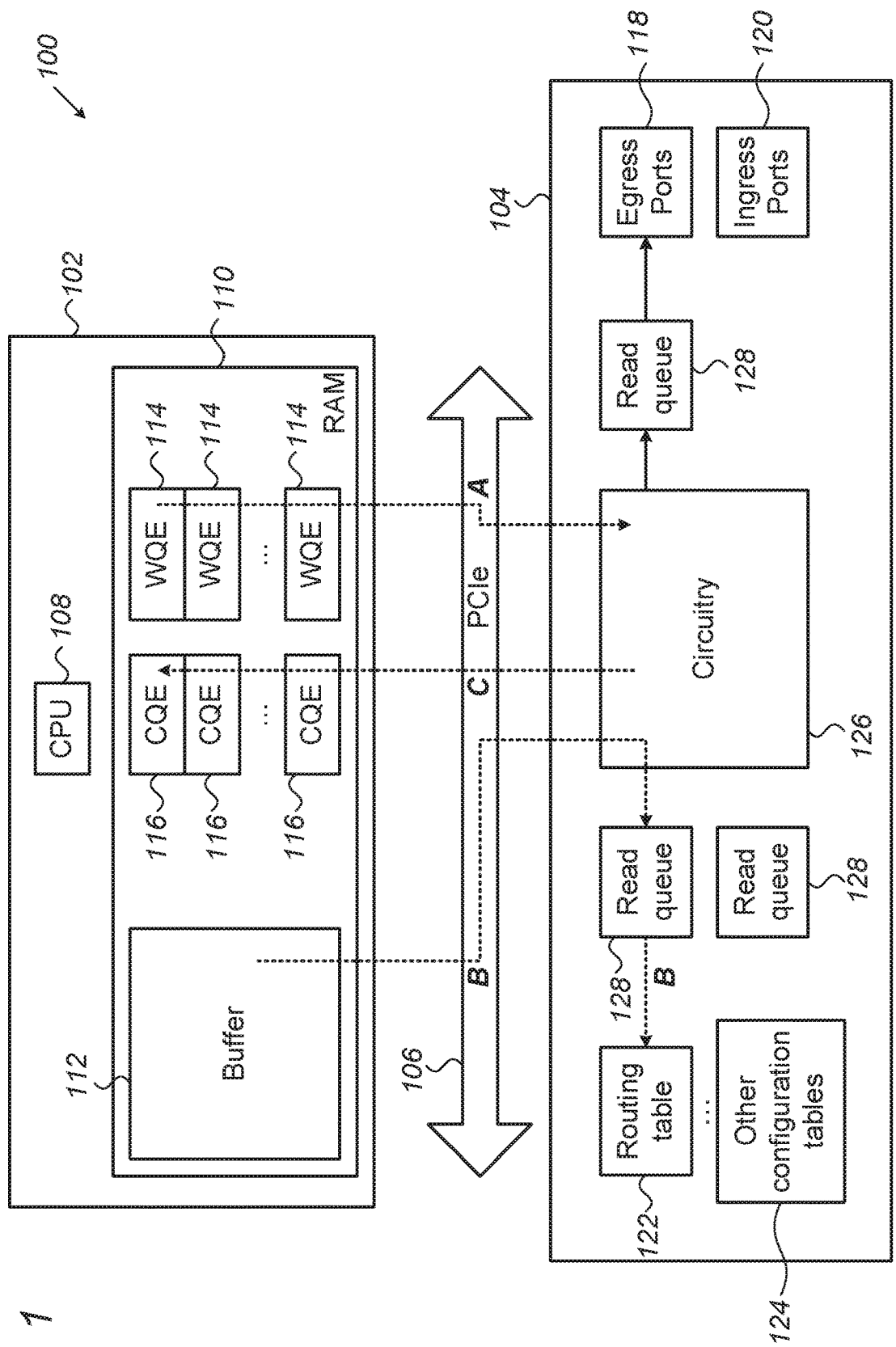
FIG. 1 is a block diagram that schematically illustrates the transfer of a Routing-Hardware ("RH") configuration database in a network element, in accordance with an embodiment of the present invention.

Network elements, such as network switches, receive packets from ingress ports and forward packets to egress ports, according to routing and other rules. A typical switch comprises a routing hardware that routes the packets, and a processor, which controls and monitors the operation of the routing hardware. We will refer to hereinbelow to the routing hardware as "RH".

Typically, the RH handles input packets according to data that is stored in one or more tables. For example, a routing table may store rules for routing packets according to fields in the packet headers, and a firewall table may define security policies for packets.

To monitor the operation of the RH, e.g.—for diagnostics, for real time statistics gathering, for updating the host as to any modifications that the RH may have done to its configuration, and for other purposes, the RH typically generates status reporting data, that is then forwarded to the processor. The processor may use such status data to adjust the operation of the RH for better performance (for example, by modifying the routing tables).

We will refer hereinbelow to RH configuration tables as "RH-configuration-database". The term Configuration-Database, in the context of the description hereinbelow, refers to any tabular data that the RH may need for its operation, including (but not limited to) routing tables, permission tables, service class tables, firmware, and queue configuration data.

We will further refer to any tabular data that the RH may send to the processor as "RH-status-database" (or "hardware status database"). The term RH Status Database, in the context of the description hereinbelow, refers to any tabular data that the RH may send to the processor, including (but not limited to) monitoring tables, queue length statistics, control status dump, counter dump, packet sampling dump, and/or routing tables (routing tables are sometimes modified by the RH). We will refer collectively to the RH-configuration-database and to the RH-status-database as "RH database". In some practical cases the RH database may be very large, e.g., on the order of 10 MB or more.

A Network Interface (NI), also referred to as Network Interface Controller (NIC), is another example of a network element that sends and receives packets. A typical NI comprises one or more ports, packet processing hardware that transfers packets to and from the ports, and a processor that communicates with a host system. The packet processing hardware in the NIC typically processes the packets in accordance with one or more tables, also referred to as databases, provided by the processor. The packet processing hardware may generate RH status data that is forwarded to the processor.

In the present context, the term "packet processing hardware" refers to the RH in a switch, to the packet processing hardware in a NI, and to other similar hardware in other types of network elements. The term "database" will refer to the various databases transferred between the processor of a network element (e.g., switch or NI) and the packet processing hardware. Databases may comprise, for example, RH databases (e.g., configuration databases or RH-status databases) in a switch, or databases used for configuration or status database in a NI.

Embodiments of the present invention that are presented herein provide for accelerated transfer of databases between the processor and the packet processing hardware. In some embodiments, the packet processing hardware comprises a fast data transfer circuitry that is configured to transfer data between the processor and the network ports, and between the processor and the packet processing hardware. The description that follows refers mainly to the interaction between the RH and the processor in a switch, by way of example. The disclosed techniques are applicable in a similar manner to NICs and other suitable network elements.

In an embodiment, to transfer an RH-configuration-database to the RH, the processor first stores the database in a memory that is accessible by the RH, and then writes one or more work-queue-elements in a queue that is also accessible to the RH. The queue may be in the same or in a different RH-accessible memory. The work-queue elements ("WQEs") are typically (but not necessarily) contiguous transfer instructions; for example—transfer 1M bytes starting at address 0x208C0000, to table 6, from location 0x440000. The processor then notifies the RH that a configuration database is ready to be transferred.

Next, the RH reads the WQEs and loads the configuration database from the memory. In an embodiment, the RH sends a completion queue element ("CQE") to the processor to indicate that the RH has completed the execution of a corresponding WQE. In some embodiments the RH writes the CQEs in a memory that is accessible by both the processor and the RH.

According to embodiments, the RH transfers RH-database to or from the memory over a fast system bus, e.g. Peripheral Component Interconnect Express ("PCIe"). The RH may pre-fetch the work-elements and utilize a fast DMA circuitry, and, hence, the transfer of the RH-database may be done uninterrupted, at the maximum speed supported by the system bus.

In some embodiments, when the RH database or parts thereof change (e.g. a new routing table is ready), the RH is prevented from transferring packets until the new table is completely loaded in the RH. Consequently, packets accumulate in buffers, increasing the latency. In extreme cases packets may be dropped. It is, therefore, of paramount importance to load the database tables from the processor to the RH at a high speed.

In some embodiments, when the RH executes the WQEs that load a new configuration table, the processor verifies that the table has been completely loaded by checking all associated CQEs. Only then will the processor indicate to the RH that the new configuration table should take effect.

According to embodiments, RH-status-database may comprise, for example, run-time monitoring of RH variables such as queue lengths, packet size, etc., as well as other status tables. In a typical embodiment, the RH may constantly update the status database with new status values. The processor may need to read the status tables, for example, periodically, or, for another example, when some packets are dropped. As described above, the techniques disclosed herein provide for efficient RH-database transfer, including status table upload.

In some embodiments, although not necessarily, separate queues are maintained for transferring of communication packets and for transferring databases. Alternatively, a given work queue may be used for queuing WQEs relating to both communication packets and databases, and/or a given completion queue may be used for queuing CQEs relating to both communication packets and databases. In some embodiments, the data-transfer circuitry transfers (uploads and/or downloads) two or more databases in parallel.

Thus, according to embodiments of the present invention that are provided herein, RH database can be downloaded from the processor or uploaded to the processor, using existing DMA circuitry that is also used for sending and receiving network packets between the ports and the processor. The transfer is fast, and the processor is effectively offloaded of the transfer tasks.

System Description

In the description hereinbelow, the term "network element" will usually refer to network switches; however, embodiments according to the present invention are by no way limited to network switches; rather, according to embodiments of the present invention, a "network element" refers to any apparatus that sends and/or receives network data, for example a router or a network interface controller (NIC).

FIG. 1 is a block diagram that schematically illustrates the transfer of an RH configuration database in a network element, in accordance with an embodiment of the present invention. A Network Element 100 comprises a Processor 102, an RH 104, and a System Bus 106, that is coupled to both the Processor and the RH (and, possibly, to other units of the network element that are not shown, such as storage units). The system bus could be, for example, Peripheral Component Interconnect Express ("PCIe").

According to embodiments, Processor 108 is typically (but not exclusively) integrated in a Printed-Circuit-Board (PCB). The processor comprises a CPU 108 and a Random-Access Memory (RAM) 110, as well as other units that are not shown.

For the fast transfer of data from the processor to the RH, the processor allocates areas in RAM 110: A Buffer area 112, Work Queue Elements (WQEs) area 114, and Completion Queue Elements (CQEs) area 116.

According to embodiments, RH 104 comprises Egress Ports 118, Ingress Ports 120 (that are not described with reference to the example embodiment of FIG. 1), A Routing Table 122, and other configuration tables 124. To transfer data to the routing table (and to other configuration tables) and to the Egress Ports, RH 104 further comprises a Data Transfer Circuitry 126 (also referred to herein as "circuitry" for brevity) and Read-Queues 128 (RH 104 typically further comprises other units, like a crossbar switch, which are not shown herein, for clarity.)

According to embodiments, Routing Tables 122, Other Configuration Tables 124 and Read Queues 128 are RAMs or portions thereof. For example, all Read Queues 128 may be stored in a single RAM module, whereas Routing Tables 122 and Other Configuration Tables 124 may be stored in separate RAM modules, optimized for fast access.

Circuitry 126 is configured to read WQEs from RAM 110, execute the WQEs and write corresponding CQEs in the RAM.

According to the example embodiment of FIG. 1, the WQEs comprise instructions to transfer data from the buffer. Data may be directed to Egress Ports 118 (e.g., Border Gateway Protocol (BGP), Internal Control Message Protocol (ICMP)), or to the RH configuration tables (through Read Queues 128), such as Routing Table 122 and Other Configuration Tables 124.

In an embodiment, activities that the circuitry executes pertaining to the transfer of data from the processor to the routing table comprise: A) reading the WQEs from RAM 110 over system-bus 106; B) executing the WQEs, typically by transferring blocks of data from Buffer 112 to Routing Table 122, through system-bus 106 and through Read Queue 128; and C) writing CQEs 116 in RAM 110.

The structure described above allows fast transfer of data from the processor: CPU intervention is limited to pre-transfer (preparation of the WQEs) and post-transfer (checking CQEs); the queues and other hardware (e.g., PCIe interface; not shown) organize the transferred data to achieve the maximum PCIe transfer rate, and the queues allow prefetch of WQEs and pipelined operation with minimum or no interruption of the data transfer.

It should be noted that the circuitry executes the same activities A through C when transferring data from the processor to Egress Ports 118, to Routing Tales 122 or to Other Configuration Tables 124—the difference is the selected Read Queue and the final-destination (in some embodiments, network element 100 may comprise additional paths to send packets to the network through the egress ports).

Thus, according to the example embodiment illustrated in FIG. 1 and described above, circuitry in the RH transfers RH database efficiently from the processor to any RH configuration table or to any Egress port. Particularly, transfer of RH database to the configuration tables can be done efficiently, at speeds comparable to the speed of outputting egress packets, and with no or low loading of the CPU.

Figure 2:
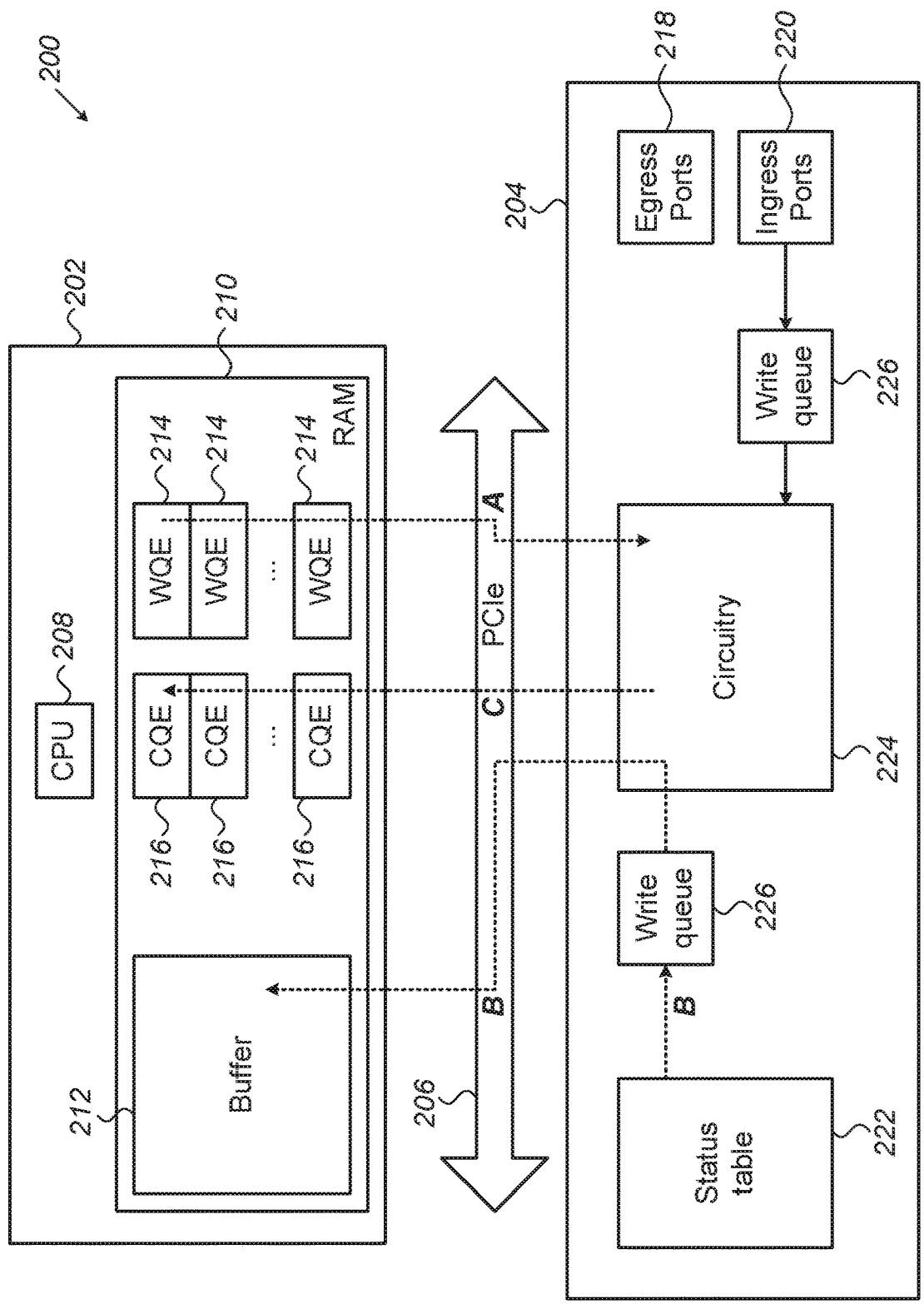
FIG. 2 is a block diagram that schematically illustrates the transfer of an RH status-database in a network element, in accordance with an embodiment of the present invention.

FIG. 2 is a block diagram that schematically illustrates the transfer of an RH status-database in a network element, in accordance with an embodiment of the present invention. A Network Element 200 comprises a Processor 202, an RH 204 and a system bus 206. The processor, including CPU 208 and RAM 210, may be identical to processor 102, CPU 108 and RAM 110 of FIG. 1, and System Bus 206 may be identical to system bus 106 (RH 204 typically further comprises other units, like a crossbar switch, which are not shown herein, for clarity.)

For the fast transfer of data from the RH to the processor, the processor allocates areas in RAM 210: A Buffer area 212, WQEs area 214, and CQEs area 216. According to embodiments, RH 204 comprises Egress Ports 218 (that are not described with reference to the example embodiment of FIG. 2), Ingress Ports 220 and a Status table 222. To transfer data from the Status table, and from the Ingress Ports, RH 204 further comprises a Data Transfer Circuitry 224 (also referred to herein as "circuitry" for brevity) and Write-Queues 226.

According to embodiments, Status Table 222 and Write Queues 226 are RAMs or portions thereof. For example, all Write Queues 226 may be stored in a single RAM module, whereas Status Table 222 may be stored in a separate RAM, optimized for fast access.

Circuitry 224 is configured to read WQEs from RAM 202, execute the WQEs and write corresponding CQEs in the RAM. According to the example embodiment of FIG. 2, the WQEs comprise instructions to transfer data to the buffer. Data may be sourced by Ingress Ports 220 (e.g. BGP, ICMP) or by RH status tables, such as Status Table 222.

The structure described above allows fast transfer of data to the processor: CPU intervention is limited to pre-transfer (preparation of the WQEs) and post-transfer (checking CQEs); the queues and other hardware (e.g., PCIe interface; not shown) organize the transferred data to achieve the maximum PCIe transfer rate, and the queues allow prefetch of WQEs and pipelined operation with minimum or no interruption of the data transfer.

In an embodiment, activities that the circuitry executes pertaining to the transfer of data from the status table to the buffer comprise: A) reading the WQEs from RAM 210 over system-bus 206; B) executing the WQEs, typically by transferring blocks of data from the status table to Buffer 212, through Write Queue 226 and system-bus 206; and C) writing CQEs 216 in RAM 210.

It should be noted that the circuitry executes the same activities A through C when transferring data to the processor from Ingress Ports 218 or from status table 222—the difference is the selected Write Queue and the source of the data (in some embodiments, network element 200 may comprise additional paths to receive packets from the network through the ingress ports).

Thus, according to the example embodiment illustrated in FIG. 2 and described above, circuitry in the RH efficiently transfers data to the processor from any RH table or from any Ingress port. Particularly, transfer of data from the status tables can be done efficiently, at speeds comparable to the speed of inputting ingress packets, and with no or low loading of the CPU.

As would be appreciated, the structures of network elements 100 and 200, processors 102 and 202 and RH units 104 and 204 described above are cited by way of example. Network elements, processors and RH units in accordance with the disclosed techniques are not limited to the description hereinabove. In alternative embodiments, for example, the CPU may be a plurality of CPUs; Buffer 112 and 212 may be distributed; in an embodiment, the buffer may be in a separate memory that is coupled to the system bus. In some embodiments, the CQEs and the WQEs may be stored in a send-queue.

The order of stages A to C described above is not necessarily serial. In some embodiments, for example, the circuitry fetches-ahead groups of WQEs. Queues 128 and 226 may be stored in a single or in separate RAMs.

Figure 3:
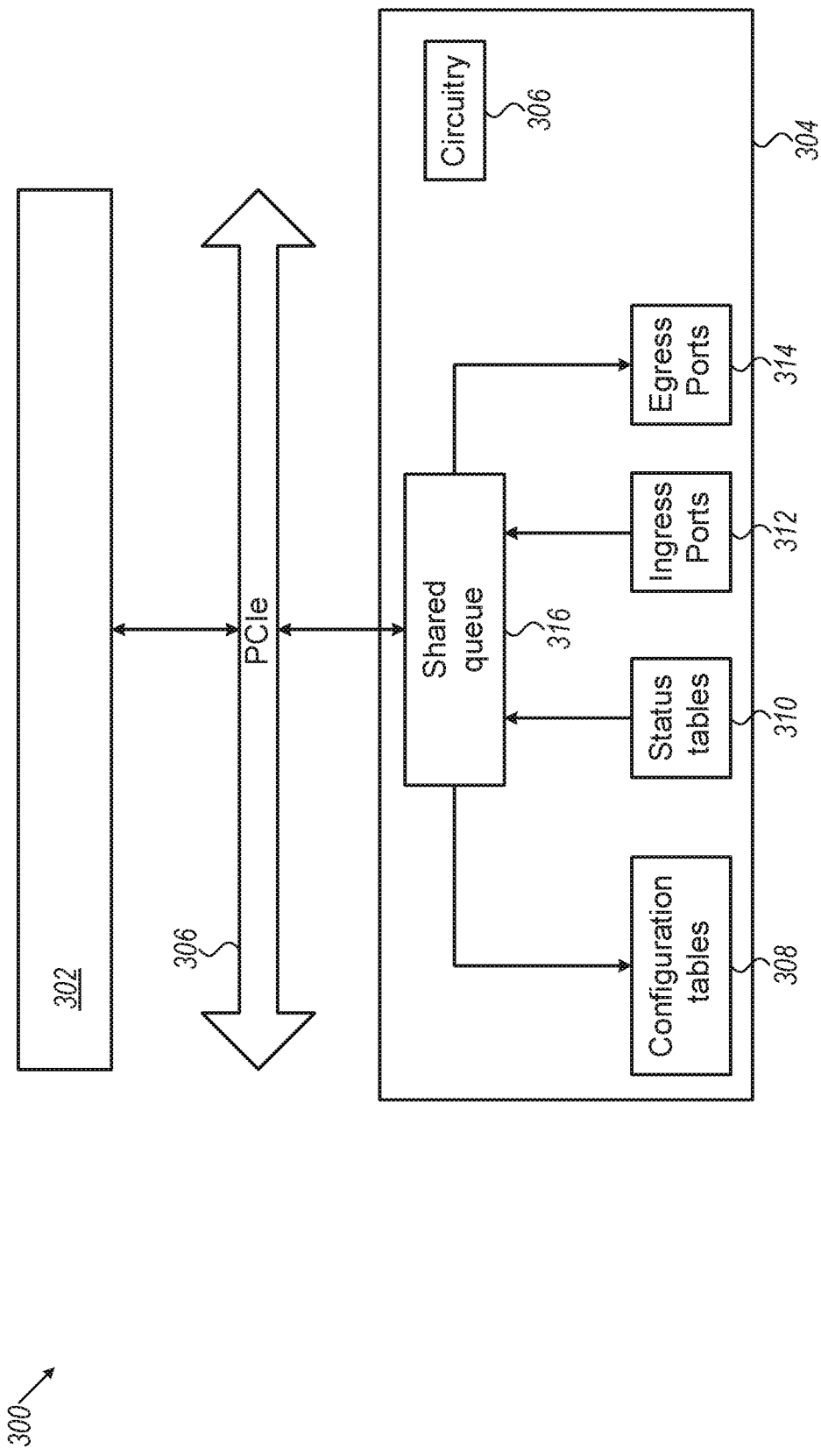
FIG. 3 is a block diagram that schematically illustrates the bidirectional transfer of RH database between a processor and the RH through a shared buffer, in accordance with an embodiment of the present invention.

FIG. 3 is a block diagram that schematically illustrates the bidirectional transfer of RH database between a processor and the RH through a shared buffer, in accordance with an embodiment of the present invention. The example embodiment illustrated in FIG. 3 combines the data download capabilities of the example embodiment of FIG. 1 and the data upload capabilities of the example embodiment of FIG. 2; and, adds a Shared Buffer.

A Network Element 300 comprises a Processor 302, an RH 304 and a system bus 306. Processor 302 and System Bus 306 may be equivalent to processors 102, 104 and system buses 106, 206, and will not be described.

RH 304 comprises a Circuitry 306, Configuration Tables 308, Status Tables 310, Ingress Ports 312 and Egress Ports 314. (RH 304 typically further comprises other units, like a crossbar switch, which are not shown herein, for clarity.)

To save silicon area, RH 304 further comprises a shared queue 316, which may be used for all data transfers. Circuitry 306 controls the shared queue, which buffers data that is transferred from the processor to any of the configuration tables and to any of the Egress ports, as well as from any of the Ingress Ports or Status Tables to the processor.

Thus, according to the example embodiment illustrated in FIG. 3 and described hereinabove, efficient two-way data transfer between the processor and RH configuration tables, status tables, ingress and egress ports is facilitated, with little or no loading of the CPU, and with shared RH buffers.

Figure 4:
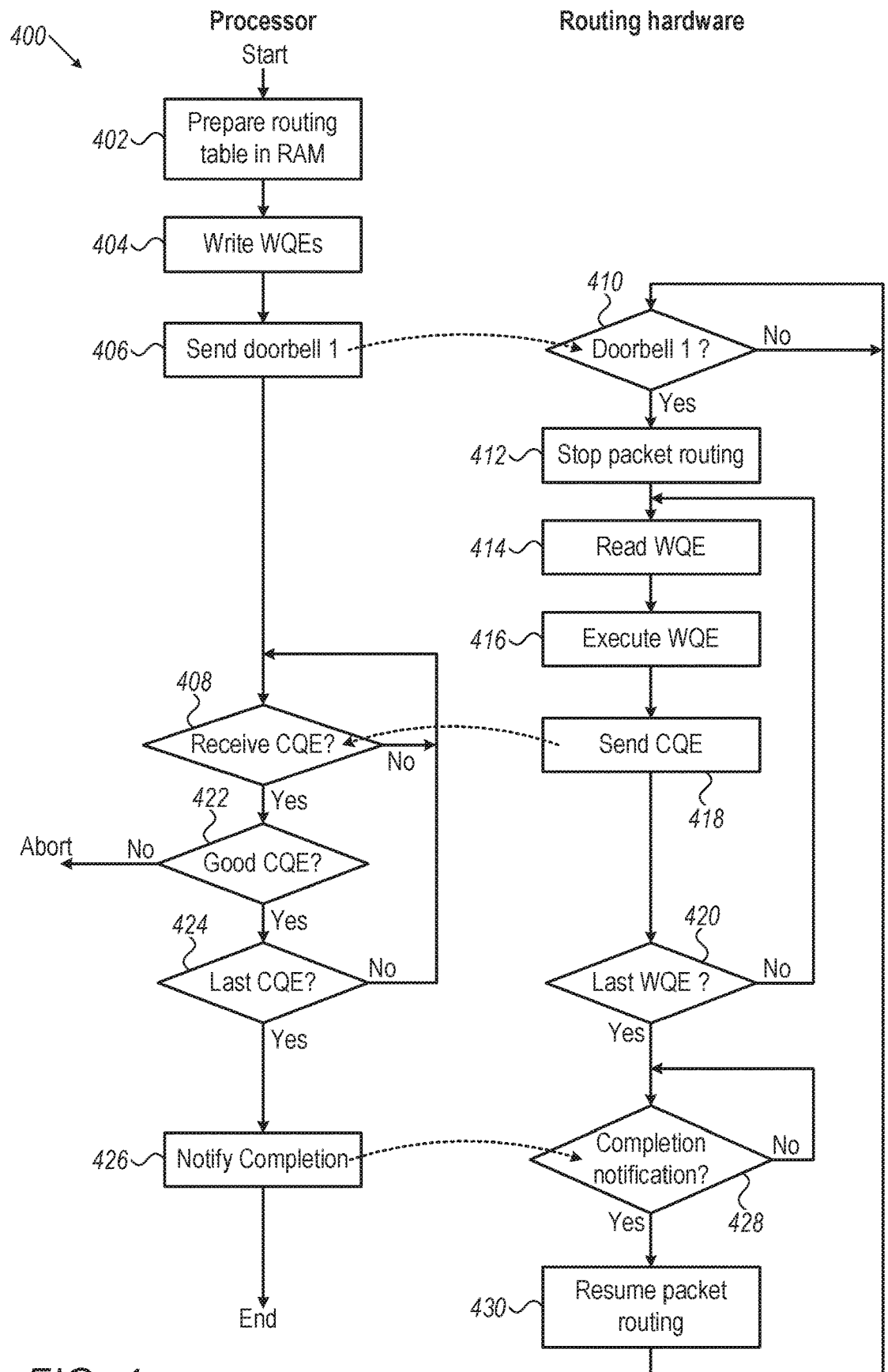
FIG. 4 is a flow chart that schematically illustrates a method for transferring a new routing table from a processor to an RH, in accordance with an embodiment of the present invention.

FIG. 4 is a flow chart 400 that schematically illustrates a method for transferring a new routing table from a processor to an RH, in accordance with an embodiment of the present invention. The flowchart is jointly executed by the CPU and the circuitry (108 and 126, respectively, in FIG. 1).

The flow starts at a Writing Routing Table step 402, wherein the CPU prepares a new routing table in Buffer 112 (FIG. 1). The CPU then proceeds to a Writing CQEs step 404 and prepares a series of CQEs that fragment the transfer of the routing table to a plurality of smaller (e.g., contiguous) data-block-transfer operations.

The CPU executes steps 402 and 404 prior to the time that the new routing table takes effect. In an embodiment, the CPU may prepare the new table in-place by editing the previous table; in other embodiments, the CPU may prepare the table by loading a template routing table to the buffer, and then editing the template table.

The CPU next enters a Sending Doorbell step 406, wherein the CPU indicates to the circuitry that a new routing table is ready for download. The indication may be done, for example, by sending a suitable message on the PCIe bus. In some embodiment, sending the doorbell may be preceded by sending a notification to the circuitry (not shown in flowchart 400), which may describe, for example, the nature of the doorbell.

The circuitry starts the flow at a Waiting for Doorbell step 410, wherein the circuitry waits for the processor to issue the Doorbell of step 406. While in step 410, the RH routes packets according to rules that are stored in the previous routing table. When the circuitry receives the doorbell, the circuitry enters a Stopping Packet Routing step 412, wherein the RH stops routing incoming packets.

From this point, incoming packets accumulate in an ingress queue; it is of paramount importance to reduce the accumulation time, to avoid packet dropping or, alternatively, to avoid the use of large buffers for the ingress queue.

After step 412, the circuitry starts to download the new routing table. The circuitry enters a Reading WQE step 414 and reads a first WQE 116 from RAM 110 (FIG. 1); next, the circuitry enters an Executing WQE step 416 and executes the WQE (typically transferring a contiguous block of data from buffer 112 to routing table 122, through read-queue 128).

After executing the WQE, the circuitry enters a Sending CQE step 418, and writes a completion queue entry in a CQE area 116 (FIG. 1). The CQE may comprise various fields that allow the CPU to verify that the WQE has been completed successfully.

Next, the circuitry enters a Checking Last WQE step 420, and checks if the current WQE is the last one. If there are more CQEs, the circuitry will re-enter step 414, to get the next WQE.

The CPU, after sending the doorbell in step 406, enters a Getting CQE step 408, and waits for a CQE from the circuitry. It is important to note that, during the time that the circuitry executes the WQE, the CPU is idle (in practice, busy executing other tasks), and hence the loading of the CPU is low. When the CPU receives the CQE, the CPU enters a Checking-CQE step 422 and tests the CQE against predefined success/fail criteria (comprising, for example, CRC signature verification, and checking the size of the transferred data). If the CQE fails the test, the CPU may abort the flow. If the test passes, the CPU enters a Checking Last CQE step 424, and checks if the current CQE is the last one. If the CQE is not the last one, the CPU will re-enter step 408, to get the next CQE. If the CQE is the last one, the CPU will enter a Notifying Completion Step 426 and indicate to the circuitry that it is OK to start using the new routing table. After step 426, the CPU ends the flow.

If, in step 420, the circuitry finds out that the current WQE is the last WQE, the circuitry enters a Waiting for Completion Notification step 428 and waits for a completion notification to be issued by the processor. When the circuitry receives the completion notification, the circuitry enters a Resuming Packet Routing step 430, wherein the RH resumes packet routing, according to the new routing table. Thereafter, the circuitry re-enters step 410, and waits for the next configuration table load.

Thus, according to the example flowchart illustrated in FIG. 4 and described above, a new routing table can be loaded from the processor to the RH. Loading is done using WQE-CQE protocol, at high speed and with little loading of the CPU. The mechanism used to transfer data to the routing table is the same mechanism that is used to transfer data to egress ports; hence the cost to implement is low and the performance is high, relative to other solutions.

Figure 5:
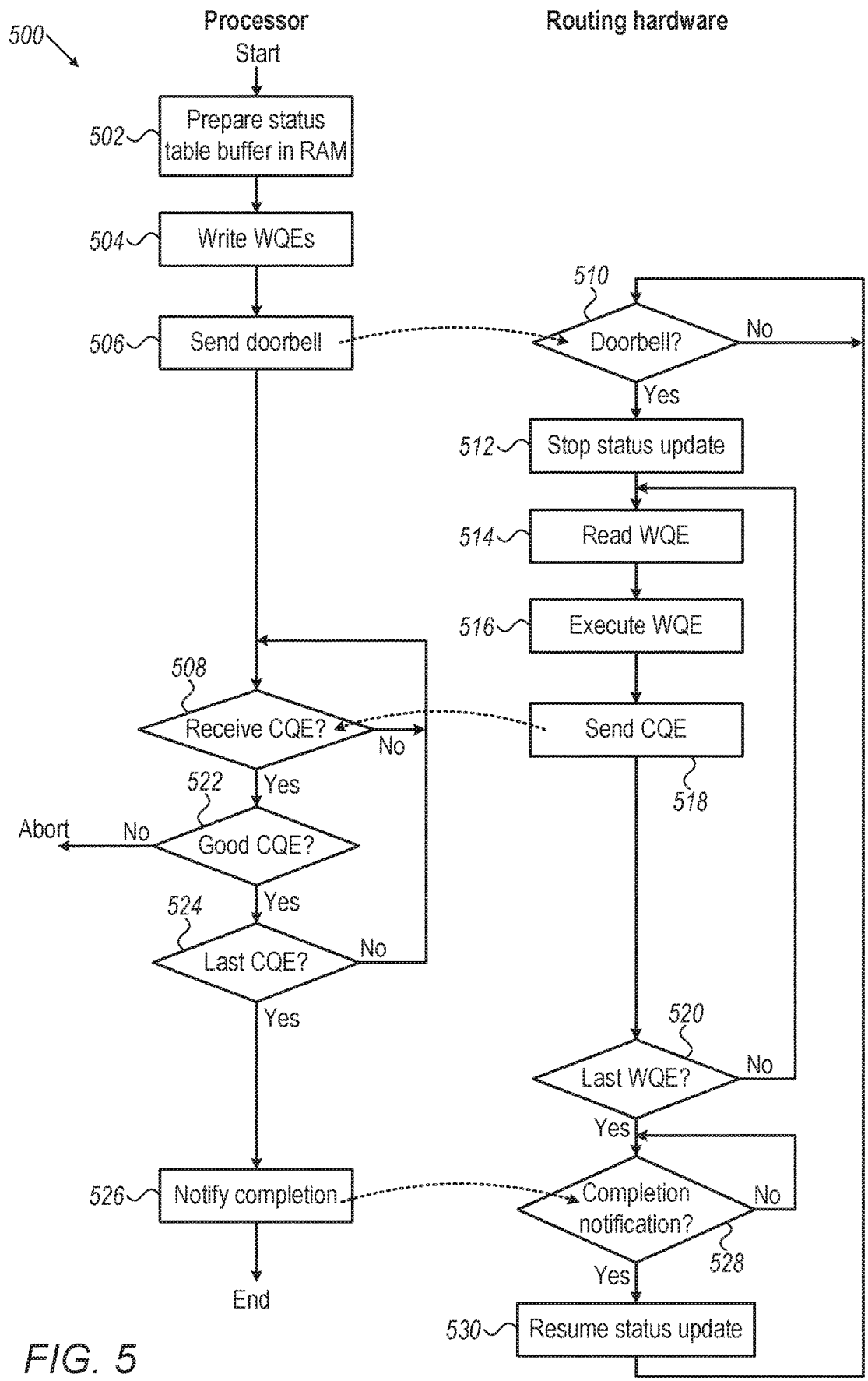
FIG. 5 is a flow chart that schematically illustrates a method for transferring a new status table from an RH to a processor, in accordance with an embodiment of the present invention.

The flow associated with table upload is similar to the download flow; the main difference is the direction of the data transfer. FIG. 5 is a flow chart 500 that schematically illustrates a method for transferring a new status table from an RH to a processor, in accordance with an embodiment of the present invention. The flowchart is jointly executed by the CPU and the circuitry (208 and 226, respectively, in FIG. 2).

The flow starts at a Preparing Table Buffer step 502, wherein the CPU prepares a Buffer 212 (FIG. 2) for receiving the RH status database. The CPU then proceeds to a Writing CQEs step 504 and prepares a series of CQEs that fragment the transfer of the status table to data-block-transfer operations.

The CPU executes steps 502 and 504 while the current status table is "alive" (that is—registering RH status). To load the status table, the CPU enters a Sending Doorbell step 506, wherein the CPU indicates to the circuitry that the current status table should be frozen and sent to the processor. The indication may be done, for example, by sending a suitable message on the PCIe bus. In some embodiment, sending the doorbell may be preceded by sending a notification to the circuitry (not shown in flowchart 500), which may describe, for example, the nature of the doorbell.

The circuitry starts the flow at a Waiting for Doorbell step 510, wherein the circuitry waits for the processor to issue the doorbell of step 506. When the circuitry receives the doorbell, the circuitry enters a Stop Status-Update step 512, wherein the status update of RH stops, and the status table freezes.

After step 512, the circuitry starts to upload the frozen status table. The circuitry enters a Reading WQE step 514 and reads the first WQE 216 from RAM 210 (FIG. 2); next, the circuitry enters an Executing WQE step 516 and executes the WQE (typically transferring a contiguous block of data from status table 222 to buffer 212, through read-queue 226).

After executing the WQE, the circuitry enters a Sending CQE step 518, and writes a completion report entry in a CQE area 216 (FIG. 2). The CQE may comprise various fields that allow the CPU to verify that the WQE has been completed successfully.

Next, the circuitry enters a Checking Last WQE step 520, and checks if the current WQE is the last one. If there are more CQEs, the circuitry will re-enter step 514, to get the next WQE.

The CPU, after sending the doorbell in step 506, enters a Getting CQE step 508, and waits for a CQE from the circuitry. During the time that the circuitry executes the WQE, the CPU is free to execute non-related tasks, and hence the loading of the CPU is low. When the CPU receives the CQE, the CPU enters a Checking-CQE step 522 and tests the CQE against success/fail criteria. If the CQE fails the test, the CPU may abort the flow. If the test passes, the CPU enters a Checking Last CQE step 524, and checks if the current CQE is the last one. If the CQE is not the last one, the CPU will re-enter step 508, to get the next CQE. If the CQE is the last one, the CPU will enter a Notifying Completion Step 526 and indicate to the circuitry that it is OK to resume status update, using a new status table. After step 526, the CPU ends the flow.

If, in step 520, the circuitry finds out that the current WQE is the last WQE, the circuitry enters a Waiting for Completion Notification step 528, and waits for Completion Notification to be issued by the processor. When the circuitry receives the completion notification, the circuitry enters a Resume Status Update step 530, wherein status updating resumes, with the status registered in a new status table. Thereafter, the Circuitry re-enters step 510, and waits for the next status table load.

Thus, according to the example flowchart illustrated in FIG. 5 and described above, a status table can be loaded from the RH to the processor. Uploading is done using WQE-CQE protocol, at high speed and with little loading of the CPU. The mechanism used to transfer the status table to the processor is the same mechanism that is used to transfer data from ingress ports to the processor; hence the cost to implement is low and the performance is high, relative to other solutions.

As would be appreciated, flows 400 and 500 described above are cited by way of example. Flows in accordance with the disclosed techniques are not limited to the description hereinabove. For example, in alternative embodiments, failed checks in steps 422 and 522 may trigger a retry rather than abort, and only after a preset number of failed retries will the flow abort. In some embodiments, the circuitry prefetches a plurality of WQEs, and executes the WQEs from an internal queue.

In an embodiment, the CPU defers entering step 406 to a time when the new routing table is to be loaded (that is, the new table will be ready for download, but the loading will be deferred). Similarly, in FIG. 5, the circuitry may defer entering step 506.

In some embodiments, status update is not stopped when status table upload takes place. Similarly, in embodiments, routing is not stopped when a new routing table is loaded.

In some embodiments, a timeout check is added, to stop the flow (and reinstate the previous tables) if the CPU fails to send a second doorbell in a predefined time limit.

The configuration of Network elements 100, 200 and 300, including processors 102, 202, 302 and RH units 104, 204, 304, and all subunits thereof, methods 400 and 500, are example configurations and methods that are shown purely for the sake of conceptual clarity. Any other suitable configurations and methods can be used in alternative embodiments.

In some embodiments, for example, RH configuration tables are sometimes updated incrementally, and, hence, requiring methods which are different from method 400. In some embodiments, a protocol other than WQE-CQE may be used; for example, CQEs may not be needed.

In various embodiments, the different elements of Circuitry 126, 204 and 306 may be implemented using suitable hardware, such as one or more Application-Specific Integrated Circuits (ASIC) or Field-Programmable Gate Arrays (FPGA), or a combination of ASIC and FPGA.

Each of CPUs 108 and 208 typically comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Although the embodiments described herein mainly address transfer of routing hardware databases in switches and databases in general in NICs, the methods and systems described herein can also be used in other applications such as computing and telemetry.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
   one or more ports for communicating over a network;
   a processor; and
   packet processing hardware, configured to transfer packets to and from the ports, the packet processing hardware further comprising data-transfer circuitry for data transfer with the processor,
   wherein the processor and the data-transfer circuitry are configured to transfer between one another (i) one or more communication packets for transferal between the ports and the processor and (ii) one or more databases for transferal between the packet processing hardware and the processor, by:
      translating, by the processor, the transferal of both the communication packets and the databases into work elements, and posting the work elements on one or more work queues in a memory of the processor; and using the data-transfer circuitry, executing the work elements so as to transfer both the communication packets and the databases, wherein the databases comprise one or more of (i) a configuration database that the processor sends to the packet processing hardware for configuring the packet processing hardware, and (ii) a hardware status database that the packet processing hardware sends to the processor.

2. The network element according to claim 1, wherein the packet processing hardware comprises a shared queue for buffering data associated with both the communication packets and the databases.

3. The network element according to claim 1, wherein the network element comprises a network switch, and wherein the packet processing hardware is configured to route the packets between the ports.

4. The network element according to claim 1, wherein the network element comprises a network interface, and wherein the packet processing hardware is configured to forward the packets between the ports and a host system.

5. The network element according to claim 1, wherein the packet processing hardware comprises separate queues for buffering data associated with the communication packets and for buffering data associated with the databases.

6. The network element according to claim 1 and wherein the hardware status database comprises one or more of the following: monitoring tables; queue length statistics; a control status dump; counter dump; packet sampling dump; and routing tables.

7. A communication method in a network element comprising one or more ports connected to a network, a processor and packet processing hardware, the method comprising:

transferring packets to and from the ports using the packet processing hardware; and transferring, between the processor and data-transfer circuitry in the packet processing hardware, (i) one or more communication packets for transferal between the ports and the processor and (ii) one or more databases for transferal between the packet processing hardware and the processor, by:

translating, by the processor, the transferal of both the communication packets and the databases into work elements, and posting the work elements on one or more work queues in a memory of the processor; and using the data-transfer circuitry, executing the work elements so as to transfer both the communication packets and the databases, wherein transferring the databases comprises one or more of (i) transferring a configuration database from the processor to the packet processing hardware for configuring the packet processing hardware, and (ii) transferring a hardware status database from the packet processing hardware to the processor.

8. The method according to claim 7, wherein transferring the communication packets and the databases comprises buffering data associated with both the communication packets and the databases in a shared queue in the packet processing hardware.

9. The method according to claim 7, wherein the network element comprises a network switch, and wherein transferring the packets comprises routing the packets between the ports.

10. The method according to claim 7, wherein the network element comprises a network interface, and wherein transferring the packets comprises forwarding the packets between the ports and a host system.

11. The method according to claim 7, wherein transferring the communication packets and the databases comprises buffering data associated with the communication packets and data associated with the databases in separate queues in the packet processing hardware.

12. The method according to claim 7 and wherein the hardware status database comprises one or more of the following: monitoring tables; queue length statistics; a control status dump; counter dump; packet sampling dump; and routing tables.

* * * * *